(12) United States Patent
Shah et al.

(10) Patent No.: US 9,324,055 B2
(45) Date of Patent: Apr. 26, 2016

(54) TECHNIQUES TO MANAGE REMOTE EVENTS

(75) Inventors: Roma Shah, Hyderabad (IN); Vijay Balaji M., Hyderabad (IN); Sharad Nandwani, Hyderabad (IN); Pradeep Kamalakumar, Hyderebad (IN); Atanu Banerjee, Hyderabad (IN); Ashish Kumar Singhal, Hyderebad (IN); Suresh Sunku, Hyderebad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 912 days.

(21) Appl. No.: 13/314,428

(22) Filed: Dec. 8, 2011

(65) Prior Publication Data

US 2013/0151690 A1    Jun. 13, 2013

(51) Int. Cl.
*G06F 15/173* (2006.01)
*G06Q 10/10* (2012.01)
*H04L 29/08* (2006.01)

(52) U.S. Cl.
CPC .............. *G06Q 10/10* (2013.01); *H04L 67/025* (2013.01)

(58) Field of Classification Search
CPC ..................................................... H04L 64/025
USPC ......................................................... 709/224
See application file for complete search history.

(56) References Cited

U.S. PATENT DOCUMENTS

| 6,611,862 | B2 * | 8/2003 | Reisman | ............... | G06F 8/65 |
| | | | | | 705/1.1 |
| 7,702,750 | B2 * | 4/2010 | Momtchilov et al. | ......... | 709/219 |

| 2002/0010803 | A1 | 1/2002 | Oberstein et al. | | |
| 2004/0034795 | A1 | 2/2004 | Anderson et al. | | |
| 2006/0069750 | A1 * | 3/2006 | Momtchilov | ........... | H04L 67/10 |
| | | | | | 709/219 |
| 2006/0070083 | A1 * | 3/2006 | Brunswig | ............... | H04L 67/02 |
| | | | | | 719/318 |

(Continued)

FOREIGN PATENT DOCUMENTS

| CN | 101589599 A | 11/2009 |
| CN | 102077237 A | 5/2011 |
| EP | 1973070 A1 | 9/2008 |

OTHER PUBLICATIONS

PCT International Search Report in Application PCT/US2012/066563, mailed Mar. 13, 2013, 8 pages.

(Continued)

*Primary Examiner* — Imad Hussain
(74) *Attorney, Agent, or Firm* — Julie Kane Akhter; Micky Minhas

(57) ABSTRACT

Techniques to manage remote events are described. An apparatus may comprise a processor circuit and a remote event application arranged for execution by the processor circuit. The remote event application may be operative to manage remote event notifications for a publisher entity and a subscriber entity. The remote event application may comprise, among other elements, an event monitor component operative to receive an external event notification message with a publisher entity event for the publisher entity. The event monitor component may select a custom event receiver component associated with the publisher entity from among multiple custom event receiver components, and send the external event notification message to the selected custom event receiver component. The custom event receiver component may implement custom business logic, such as code callouts designed for specific application programs or system programs. Other embodiments are described and claimed.

20 Claims, 13 Drawing Sheets

(56) References Cited

U.S. PATENT DOCUMENTS

| | | | | |
|---|---|---|---|---|
| 2006/0259361 | A1* | 11/2006 | Barhydt | G06Q 20/06 705/14.12 |
| 2007/0076749 | A1* | 4/2007 | Anantha-Raju | G05B 19/4186 370/466 |
| 2007/0100834 | A1 | 5/2007 | Landry et al. | |
| 2007/0174331 | A1 | 7/2007 | Wolf et al. | |
| 2008/0126441 | A1 | 5/2008 | Giampaolo et al. | |
| 2008/0222654 | A1 | 9/2008 | Xu et al. | |
| 2009/0024671 | A1 | 1/2009 | Johnson et al. | |
| 2012/0265871 | A1* | 10/2012 | Dowell | H04L 61/1541 709/224 |

OTHER PUBLICATIONS

"Pluggable Workflow Services", Retrieved at <<http://msdn.microsoft.com/en-us/library/ee534969.aspx>>, May 2010, pp. 2.

Andrew, Paul, "Improvements in SharePoint 2010", Retrieved at <<http://msdn.microsoft.com/en-us/magazine/ee335710.aspx, Retrieved Date: Jun. 30, 2011, pp. 12.

"Event Processing", Retrieved at <<http://www.axonframework.org/docs/0.7.x/event-processing.html>>, Retrieved Date: Jun. 30, 2011, pp. 6.

"BPM Developer skills for IBM WebSphere Lombardi Edition V7.1/7.2", Retrieved at <<https://www-304.ibm.com/jct03001c/services/learning/ites.wss/us/en?pageType=page&c=B021822E90964U52>>, Retrieved Date: Jun. 30, 2011, p. 1.

"Managing Business Events", Retrieved at <<http://download.oracle.com/docs/cd/E18727_01/doc.121/e12905/T361836T361840.htm, Retrieved Date: Jun. 30, 2011, pp. 52.

"First Office Action and Search Report Received for Chinese Patent Application No. 201210526366.3", Mailed Date: May 22, 2015, 12 pages. (MS# 333426.03).

European Extended Search Report in Application 12855187.6, mailed Jul. 3, 2015, 6 pgs.

European Communication in Application 12855187.6, mailed Jul. 21, 2015, 1 page.

* cited by examiner

TECHNIQUES TO MANAGE REMOTE EVENTS

BACKGROUND

In computing, a line of business (LOB) system typically refers to a computing or communications system providing a LOB application for customers of a business entity, sometimes referred to as an enterprise. A LOB application is some form of a mission critical software application for an enterprise. One example of a LOB application is a customer relationship management (CRM) application. A CRM application is designed to organize, automate and synchronize business processes for sales, marketing, customer service, and technical support. Knowledge workers may access a CRM application over a network from anywhere around the world to create, consume and update customer data.

In some cases, a LOB system is integrated with other support systems used by an enterprise. A LOB system may be designed to interoperate with internal enterprise servers customized for specific business processes of the enterprise. For instance, a CRM application might manage customer data as part of a larger sales process of an enterprise controlled from one or more enterprise servers. In such cases, a LOB system may need to synchronize LOB data with enterprise servers. Data synchronization operations have associated costs measurable in terms of computing resources and communications resources. Typically such costs are a function of a given level of performance, with a higher level of performance having a higher associated cost. As such, there is an ongoing need for efficient data synchronization techniques to reduce costs at a given level of performance. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments may be directed to one or more enhanced remote event management techniques for a machine-to-machine (M2M) system. In particular, some embodiments may be directed to enhanced remote event management techniques implemented by an enterprise system to manage event notifications from one or more LOB systems on behalf of one or more client devices. A LOB system may generally manage and store business data for a business entity, referred to as LOB data. A LOB system may notify an enterprise system of any changes or modifications made to business data stored by the LOB system using a push notification model. The enterprise system may receive the push notifications, and route the push notifications to custom event receivers designed to execute custom business logic in response to change events, including notifying various client devices of change events.

In one embodiment, for example, an apparatus may comprise a processor circuit and a remote event application arranged for execution by the processor circuit. The remote event application may be operative to manage remote event notifications for a publisher entity and a subscriber entity. The remote event application may comprise, among other elements, an event monitor component operative to receive an external event notification message with a publisher entity event for the publisher entity. The event monitor component may select a custom event receiver component associated with the publisher entity from among multiple custom event receiver components, and send the external event notification message to the selected custom event receiver component. The custom event receiver component may implement custom business logic, such as code callouts designed for specific application programs or system programs. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
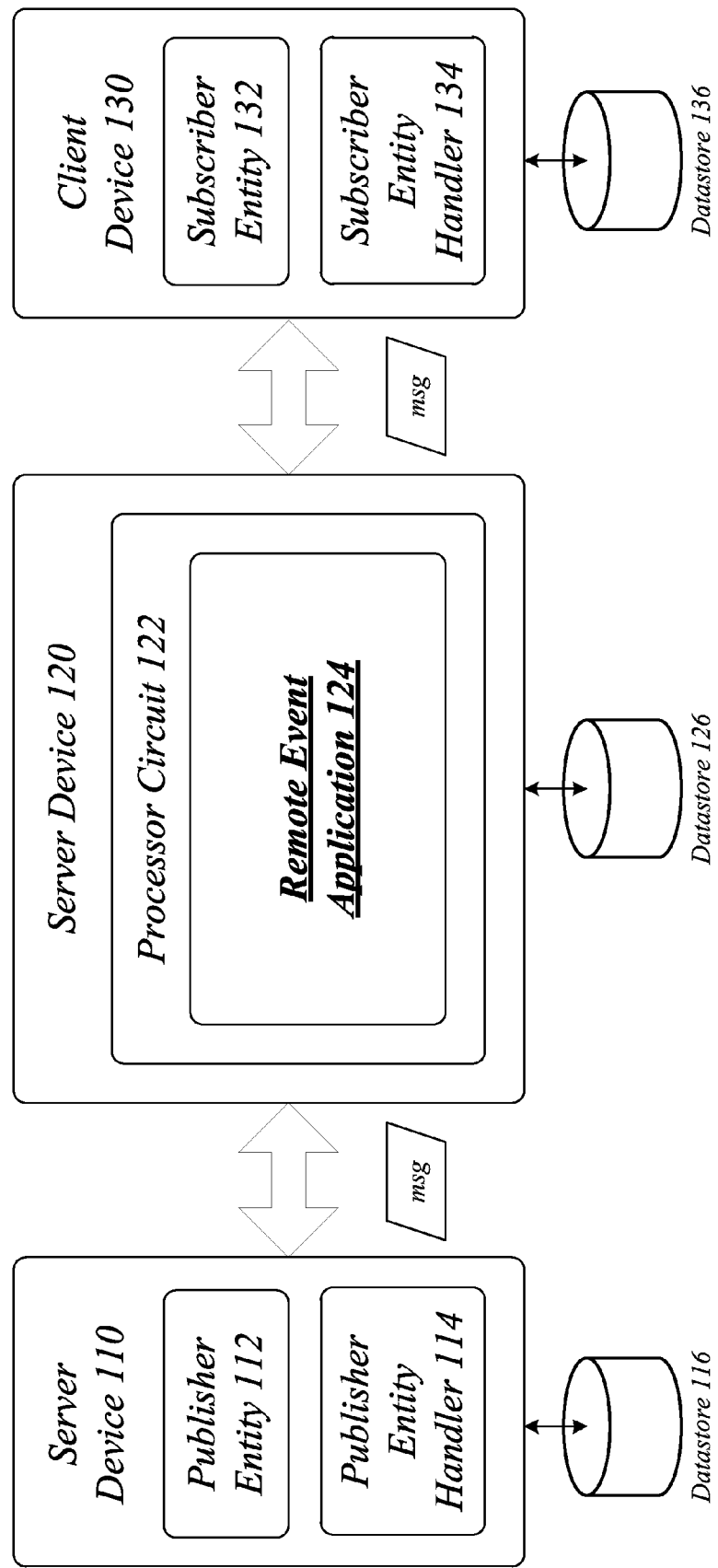
FIG. 1 illustrates one embodiment of a remote event management system.

Various embodiments are directed to enhanced remote event management techniques for an enterprise system. More particularly, some embodiments may be directed to enhanced remote event management techniques for managing event notifications between heterogeneous network devices, such as different network elements of a LOB system and an enterprise system. An enterprise system may be owned and operated by a business entity. A LOB system may be owned and operated by an independent third-party vendor providing application and data services to the enterprise system. One example of a network element for a LOB system may comprise a LOB server or server array executing a LOB application, such as a CRM application. One example of a network element for an enterprise system may comprise an enterprise server or server array, such as a Microsoft® SharePoint® enterprise server made by Microsoft Corporation, Redmond Wash. Other examples are described as well.

An enterprise server for an enterprise system may implement various enhanced remote event management techniques as a middle-tier platform between a LOB system and a client device. Some examples of enhanced remote event management techniques may include enhanced remote event monitor services and enhanced remote event notification services. Other enhanced remote event management techniques are described as well.

In various embodiments, an enterprise server may implement an enhanced remote event monitor service that allows a LOB system and an enterprise system to synchronize changes to LOB data managed by a LOB system in an efficient and cost-effective manner. The enterprise server may implement various custom event receivers specifically designed for different LOB systems. The custom event receivers may implement custom business logic, such as code callouts for different application programs and system programs, in response to push notifications of changes to LOB data from corresponding LOB systems. In one embodiment, the custom event receivers may be implemented as various web parts of a SharePoint web application platform, such as portlets, widgets or gadgets.

In various embodiments, an enterprise server may implement an enhanced remote event notification service that provides configurable notifications to a client device of a user when a change event occurs in LOB data managed by a LOB system. The notifications may be implemented via electronic mail (email), instant message (IM), text message, page message, short messaging service (SMS) message, multimedia messaging service (MMS), social networking service (SNS) message, or any other suitable messaging technique.

As previously described, information workers frequently create, consume and update business data (or business objects) stored in LOB systems. Some enterprise systems utilize a pull model to retrieve changed data from a LOB system. However, there are significant disadvantages associated with the pull model. For instance, business data may be not be readable by an external application because of an absence of read support for lower level objects that are internal to a LOB system, security models may prevent read access to certain objects, a business object could be a composite from one or more LOB application systems, and there will always be missed change events that occur between pull intervals.

Another potential solution is to utilize a push model to push changed data from a LOB system to an enterprise system. However, there are many different types of LOB systems, each one potentially utilizing a different set of services, service entry points, message formats, data schemas, data types, primary keys, code, and so forth. As a result, an enterprise system may have difficulty in accommodating push notifications received from such a diverse set of LOB systems in a unified manner. Further, solutions for each LOB system may utilize non-interoperable parts, thereby consuming greater amounts of computing and communications resources.

Various embodiments attempt to solve these and other problems by implementing an integrated push notification model between a LOB system and an enterprise system. Further, embodiments may implement a web service to allow a LOB system to push notifications to an enterprise system using a common addressing scheme and a common data schema. The web service may forward the LOB notifications to a custom event receiver specifically designed for each LOB system. A custom event receiver may receive the LOB notifications and perform custom business logic implemented as code callouts that can be executed by the enterprise system in response to the LOB notifications. The code callouts can be implemented in any programming language desired for a given application program or system program, such as a network operating system for a cloud computing architecture. The business logic may be specifically designed to support a business workflow managed by the enterprise server. The custom event receivers may include a notification system having notification parameters used to notify a client device of a user of any change events. Alternatively, the web service may route the LOB notifications to a notification system native to the enterprise system, which in turn notifies a client device of a user of any change events. As a result, the embodiments may implement a unified push model capable of handling multiple heterogeneous LOB systems in an efficient and effective manner. Further, the enterprise system may offer varying levels of reliability and quality-of-service (QoS) to a LOB system, thereby allowing differentiated services for mission-critical applications. These and other improvements enhance affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates one embodiment of a remote event management system 100. The remote event management system 100 may be suitable for implementing enhanced remote event management techniques for managing event notifications between heterogeneous network devices, such as different network elements of a LOB system of an independent third-party vendor and an enterprise system for a business entity utilizing application and data services offered by the LOB system. As the LOB system and the enterprise system are typically owned by different business entities, and the enhanced remote event management techniques are typically implemented by the enterprise system, the LOB system and its associated applications may sometimes be referred to herein as an "external application" or "external entity."

As shown in FIG. 1, the remote event management system 100 includes a server device 110, a server device 120, and a client device 130. It may be appreciated that the remote event management system 100 may comprise more or less elements as desired for a given implementation. The embodiments are not limited in this context.

In various embodiments, the remote event management system 100 may include a server device 110. The server device 110 may comprise an enterprise hardware platform and associated server software for a business entity suitable for storing and executing various LOB application programs to create, read, update, delete, query or otherwise process LOB data stored in a datastore 116. The server device 110 may be implemented on any hardware and/or software platform as described for the server device 120 and/or client device 130, as well as others. An exemplary computing architecture suitable for the server device 110 may be described with reference to FIG. 11. The embodiments, however, are not limited to these examples.

In one embodiment, the server device 110 may comprise or be implemented as a network element for a LOB system. A LOB system generally includes various LOB application programs typically implemented on enterprise hardware platforms for a business entity. LOB application programs are application programs designed to provide various business application services. Examples of LOB application programs may include a Customer Relationship Management (CRM) application program, an Enterprise Resource Planning (ERP) application program, a Supply Chain Management (SCM) application program, Business Intelligence (BI) application program, and other business application programs using business-oriented application logic. The LOB system may implement one or more LOB application programs having associated LOB data. The LOB data for the various LOB application programs may be stored in various elements throughout a LOB system, including the datastore 116 of the server device 110 and/or other network elements of a LOB system.

Whenever a change to LOB data is made using an LOB application program, there may be a need to promote the change event to other network elements associated with the LOB system, such as network elements of an enterprise system that is interoperable with the LOB system. Accordingly, various embodiments are directed to techniques for providing enhanced remote event management techniques that allow a LOB system to propagate changes to LOB data throughout various physical and logical devices connected to the LOB system.

The server device 110 may be arranged to propagate changes to LOB data stored in the datastore 116 using push technology. Push technology generally describes a communication technique where a sender initiates a data transfer rather than a recipient. This is contrasted with pull technology where a recipient initiates a data transfer rather than a sender. Push services are often based on information preferences expressed in advance. As such, this is sometimes referred to as a publish/subscribe model, where one software object may subscribe to services provided by another software object. A software object that subscribes to services provided by another software object is referred to herein as a "subscriber entity." A software object that provides services subscribed to be another software object is referred to herein as a "publisher entity."

As shown in FIG. 1, the server device 110 may implement a publisher entity 112. The publisher entity 112 may comprise any logical construct capable of creating, modifying, deleting, or storing LOB data. Examples for the publisher entity 112 may include a software application, a software object, or a data source, among others. In one embodiment, for example, the publisher entity 112 may comprise a data source for a LOB application storing LOB data for the LOB application, such as the datastore 116.

As shown in FIG. 1, the server device 110 may also implement a publisher entity handler 114. The publisher entity handler 114 may comprise a software application or software object implementing logic to generate and send notification messages in response to change events of the publisher entity 112. A change event may comprise any event where a portion of LOB data of the publisher entity 112 is created, modified, deleted, processed, or otherwise changes state. The publisher entity handler 114 may detect a change event for the publisher entity 112, and send a notification message to the server device 120 using a web service address as a destination address for the notification message.

In various embodiments, the remote event management system 100 may include a server device 120. In one embodiment, the server device 120 may comprise a network element for an enterprise system capable of reading LOB data. An enterprise system generally includes various business application programs typically implemented on enterprise hardware platforms for a business entity. One example of a network element for an enterprise system may comprise an enterprise server or server array, such as an enterprise server implementing Microsoft SharePoint server application software.

Microsoft SharePoint is a web application platform. SharePoint is designed as a centralized replacement for multiple web applications and supports various combinations of enterprise website requirements. It is typically associated with web content management and document management systems. SharePoint provides a multi-purpose platform that allows for managing and provisioning of intranet portals, extranets and websites, document management and file management, collaboration spaces, social networking tools, enterprise search, business intelligence tooling, process/information integration, and third-party developed solutions. SharePoint can also be used as a web application development platform.

In various embodiments, the server device 120 may comprise an enterprise hardware platform for a business entity suitable for storing and executing various business application programs to receive LOB data from the server device 110. As with the server device 110, the server device 120 may be implemented on any hardware and/or software platform as described for the server device 110 and/or client device 130, as well as others. An exemplary computing architecture suitable for the server device 120 may be described with reference to FIG. 11. The embodiments, however, are not limited to these examples.

As shown in FIG. 1, the server device 120 may comprise a processor circuit 122 and a remote event application 124 arranged for execution by the processor circuit 122. The remote event application 124 may implement various enhanced remote event management techniques as a middle-tier service between the server device 110 and the client device 130. The remote event application 124 may include appropriate interfaces for the server device 110 and the client device 130 to communicate messages with each device in a particular format or data schema implemented by each device. For instance, when the server device 110 and the client device 130 utilize different formats or data schemas for LOB data and associated messages, the remote event application 124 may perform data translation operations. However, when the server device 110 and the client device 130 utilize common formats or data schemas for LOB data and associated messages, the remote event application 124 may not perform any data translation operations and operate as a pass-through device. Additionally or alternatively, the remote event application 124 may also implement custom business logic to handle incoming and outgoing messages suitable for a given server device 110 and/or client device 130.

In various embodiments, the remote event management system 100 may include one or more client devices 130. The client device 130 may comprise any client device or client system arranged to receive notifications of change events to LOB data stored by the datastore 116 of the server device 110. Examples for the client device 130 may include without limitation a processing system, computer, server, work station, appliance, terminal, personal computer, laptop, ultra-laptop, handheld computer, personal digital assistant, smart phone, tablet computer, consumer electronics, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

The client device 130 may subscribe to the push services provided by the server device 110 via the server device 120. As such, the server device 120 may implement a subscriber entity 132 and a subscriber entity handler 134. Although the subscriber entity 132 and the subscriber entity handler 134 are shown as part of the client device 130, it may be appreciated that one or both may be implemented as part of the server device 120. In this case, the client device 130 may simply implement a messaging application (not shown) to receive notification messages from the server device 120.

A subscriber entity 132 may comprise any logical construct capable of reading LOB data. Examples for the subscriber entity 132 may include a software application, a software object, or a data source. In one embodiment, for example, the subscriber entity 132 may comprise a software object for the remote event application 124.

A subscriber entity handler 134 may comprise a software program implementing logic to receive notification messages via the server device 120 in response to change events of the publisher entity 112. The subscriber entity handler 134 may receive a notification message from the server device 120 using a messaging technique selected by a user of the client device 130, and forward the notification message to a client application.

In general operation, the publisher entity handler 114 may detect a change event (e.g., a modification of LOB data) for the publisher entity 112 on the server device 110, and send a properly formatted notification message to the remote event application 124 of the server device 110. The remote event application 124 may receive the notification message, process the notification message, route the notification message, initiate customized workflows by the server device 120, and/or send a notification message to the client device 130 in a customized manner.

In one use scenario, by way of example, assume Ichiro is a sales manager at a business entity called "Contoso" and is responsible for sales in Europe. Ichiro has a team of sales representatives who are constantly on the move. A sales representative may use a mobile application to add any customer lead to a CRM LOB system implemented by the server device 110 while in the field. Ichiro wants to be aware of all that is happening with his sales team while they are on move. Ichiro has a virtual list of all leads on a SharePoint site implemented by the server device 120. Ichiro subscribes to alerts on any addition of a lead to the virtual list so that he can see an alert in his email. When one of his sales representatives add a new customer lead to the CRM LOB system, the client device 130 used by Ichiro receives an alert as an email message in his inbox. He immediately moves to the virtual list and assigns a senior sales representative from his sales team to follow up on the new customer lead. The senior sales representative gets an alert on his client device 130 for a new task which was created as a result of Ichiro's assignment. The ability to quickly react to new customer leads results in converting more leads in a shorter time period.

In another use scenario, by way of example, assume a business entity called "Fabrikam" is a supplier for a manufacturing company which specializes in heavy engineering equipment. The purchase orders received from their customers are complex with multiple product items and each product item being addressed by different individuals in different departments. Usually a turnaround time for such queries needs to be as short as possible and the complexity of multiple individuals requiring to be updating the product items means added communication over email and follow ups. Fabrikam includes an enterprise system implementing the server device 120 as a SharePoint installation communicating with an ERP LOB system implemented by the server device 110. Every time a purchase order is created for the ERP LOB system, employees from relevant departments get an email alert at corresponding client devices 130. They are able to view the requirements on a SharePoint virtual list and update a status on the virtual list provided by the server device 120. As a result, shorter time periods are needed to process purchase orders, and Fabrikam is able to reduce turnaround time which leads to improved customer satisfaction.

Figure 2:
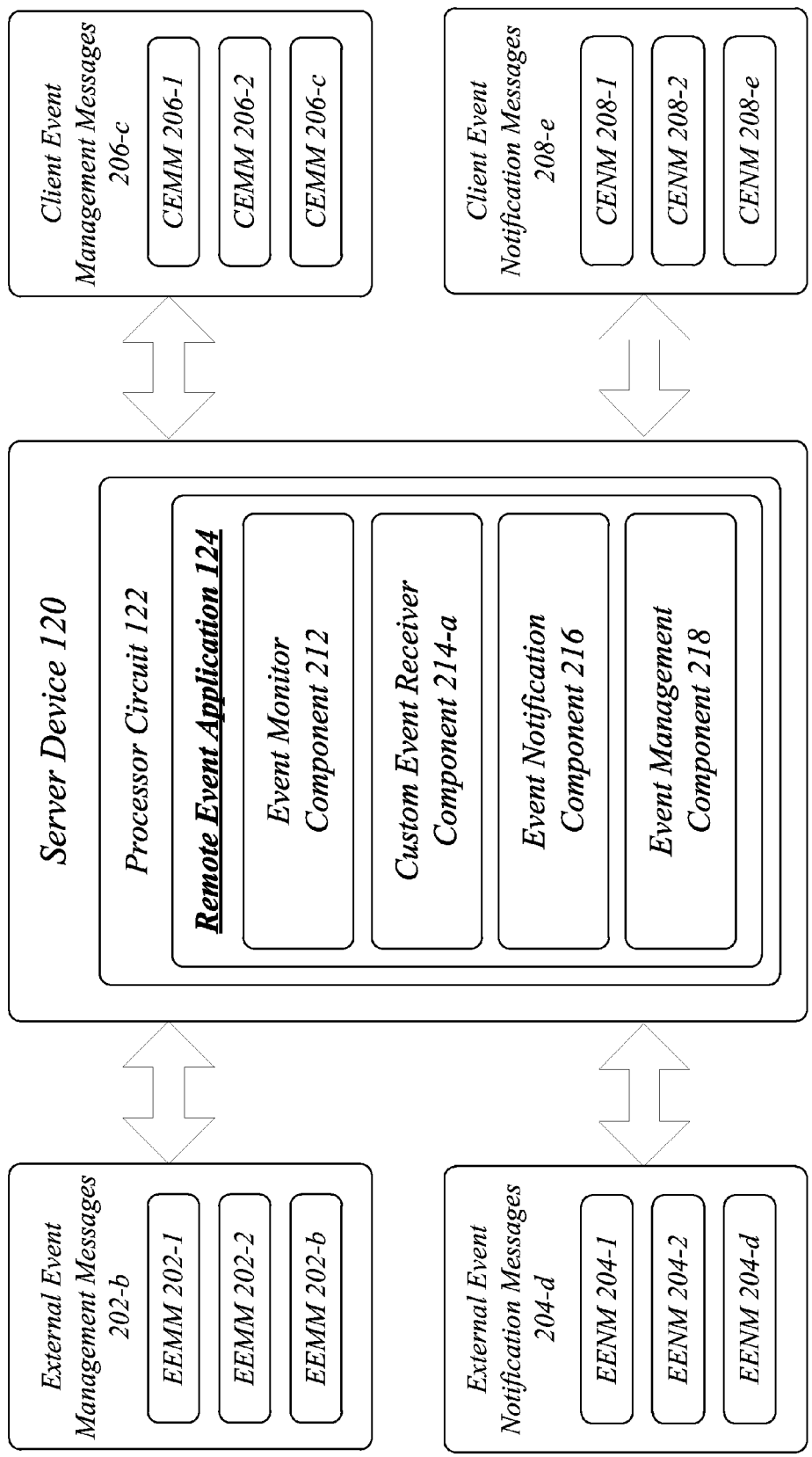
FIG. 2 illustrates one embodiment of an operational environment for a remote event management system and a more detailed diagram of a remote event application.

FIG. 2 illustrates one embodiment of an operational environment 200 for the remote event management system 100 and a more detailed diagram of the remote event application 124.

The remote event application 124 may be generally arranged to manage remote event notifications for the publisher entity 112 and the subscriber entity 132. In the illustrated embodiment shown in FIG. 1, the remote event application 124 may comprise an event monitor component 212, multiple custom event receiver components 214-a, an event notification component 216, and an event management component 218. It may be appreciated that the remote event application 124 may comprise more or less components as desired for a given implementation. The embodiments are not limited in this context.

It is worthy to note that "a" and "b" and "c" and similar designators as used herein are intended to be variables representing any positive integer. Thus, for example, if an implementation sets a value for a=5, then a complete set of custom event receiver components 214-a may include custom event receiver components 214-1, 214-2, 214-3, 214-4 and 214-5. The embodiments are not limited in this context.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

The remote event application 124 may comprise an event monitor component 212. The event monitor component 212 may be generally arranged to monitor for notification messages received from the server device 110. In one embodiment, for example, the event monitor component 212 may receive an external event notification message 204-b with information of a publisher entity event for the publisher entity 112. The publisher entity 112 may comprise, for example, the data source 116 for an LOB application implemented by the server device 110. A publisher entity event may comprise, for example, a change event for the publisher entity 112 indicating that LOB data stored by the server device 110 has changed states (e.g., addition, deletion, modified, processed, etc.).

In one embodiment, the event monitor component 212 may comprise or be implemented as a representational state transfer (REST) based input point for the remote event application 124. For instance, an exemplary REST based input point may have a signature as follows:

```
{
POST
http://site/web/_vti_bin/client.svc/web/ProcessRemoteEvent?id=xxxxxxxxxxxxxx
HTTP/1.0
Request Body:
}
```

The REST based input point allows a common service entry point for the server device 110. The common service entry point may be used exclusively by the server device 110, or shared by other server devices implementing other LOB applications as well.

The use of a REST based input point facilitates receipt of external event notification message 204-*d*, and further, allows the external event notification message 204-*d* to share a same or similar data format. For instance, when the server device 120 is implemented as a SharePoint server, the external event notification message 204-*d* may comprise part of a generic atom feed. The generic nature of the atom feed allows field names used by the external event notification message 204-*d* to be the same as those defined in the business data catalog (BDC) Model. An example of a generic atom feed is as follows:

```
<?xml version="1.0" encoding="utf-8"?>
    <feed xmlns="http://www.w3.org/2005/Atom">
        <title>Example Feed</title>
        <link href="http://example.org/"/>
        <updated>2003-12-13T18:30:02Z</updated>
        <author>
            <name>
                JohnDoe
            </name>
        </author>
        <id>urn:uuid:60a76c80-d399-11d9-b93C-
        0003939e0af6</id>
        <entry><title>Atom-Powered Robots Run     Amok
        </title>
        <link href="http://example.org/2003/12/13/atom03"/>
            <id>urn:uuid:1225c695-cfb8-4ebb-aaaa-
            80da344efa6a</id>
            <updated>2003-12-13T18:30:02Z</updated>
            <summary>Some text.</summary>
            <properties>
              <property name="BcsItemIdentity"><year>2008</year>
            <name>Avtaar</name>
            <Industry>Hollywood</Industry>
            </property> <!--Represents     the serialized
            identity property pertaining to BCS-->
            </properties>
        </entry>
    </feed>
```

As shown above, a property name "BcsItemIdentity" may be consistently used for all external event notification message 204-*d* from the LOB system implemented by the server device 110, and in some cases, for other LOB systems implemented by other server devices as well. In the latter case, the property name "BcsItemIdentity" may be consistently used for all external event notification message 204-*d* from all external LOB systems, with changes to field names for the property name as appropriate.

The remote event application 124 may comprise one or more custom event receiver components 214-*a*. The remote event application 124 needs to connect to a LOB system and inform the LOB server that it needs to be notified when a change event occurs at the LOB system. Each LOB system has its own set of application programs, entities, event types, users, services, service entry points, message formats, data schemas, data types, primary keys, code, and so forth. As such, the remote event application 124 may utilize a unique end point for a given LOB system in the form of custom event receiver components 214-*a*. The custom event receiver components 214-*a* may each implement custom business logic for a corresponding LOB system implemented by the server device 110 (or other server devices). When the remote event application 124 is implemented as a SharePoint application, for example, a new stereotype in business connectivity services (BCS) and a business data catalog (BDC) is introduced to enable connection to the server device 110 and support event receiver functionality. In one embodiment, the new stereotype may be mandated for use by the LOB system of the server device 110.

The remote event application 124 may comprise an event notification component 216. The event notification component 216 may generally provide notification services for the client device 130. The notification services may be configurable to fit a given client device 130 or user preferences for a user of the client device 130. The notification services may be implemented using various messaging techniques, applications and modalities by communicating client event notification messages 208-*e* from the server 120 to the client device 130. Examples for client event notification messages 208-*e* may include without limitation email messages, IM messages, text message, page message, SMS messages, MMS messages, SNS messages, or any other suitable message types. The embodiments are not limited in this context.

The remote event application 124 may comprise an event management component 218. The event management component 218 may generally provide management services to allow a user to a subscriber entity 132 to subscribe or unsubscribe to a publisher entity 112 utilizing one or more external event management messages 202-*b* and client event management messages 206-*c*. The event management component 218 may also offer management services to set up notification services provided by the event notification component 216. The event management component 218 may further provide management services to offer different levels of reliability and QoS for notification messages received from the server device 110.

Figure 3:
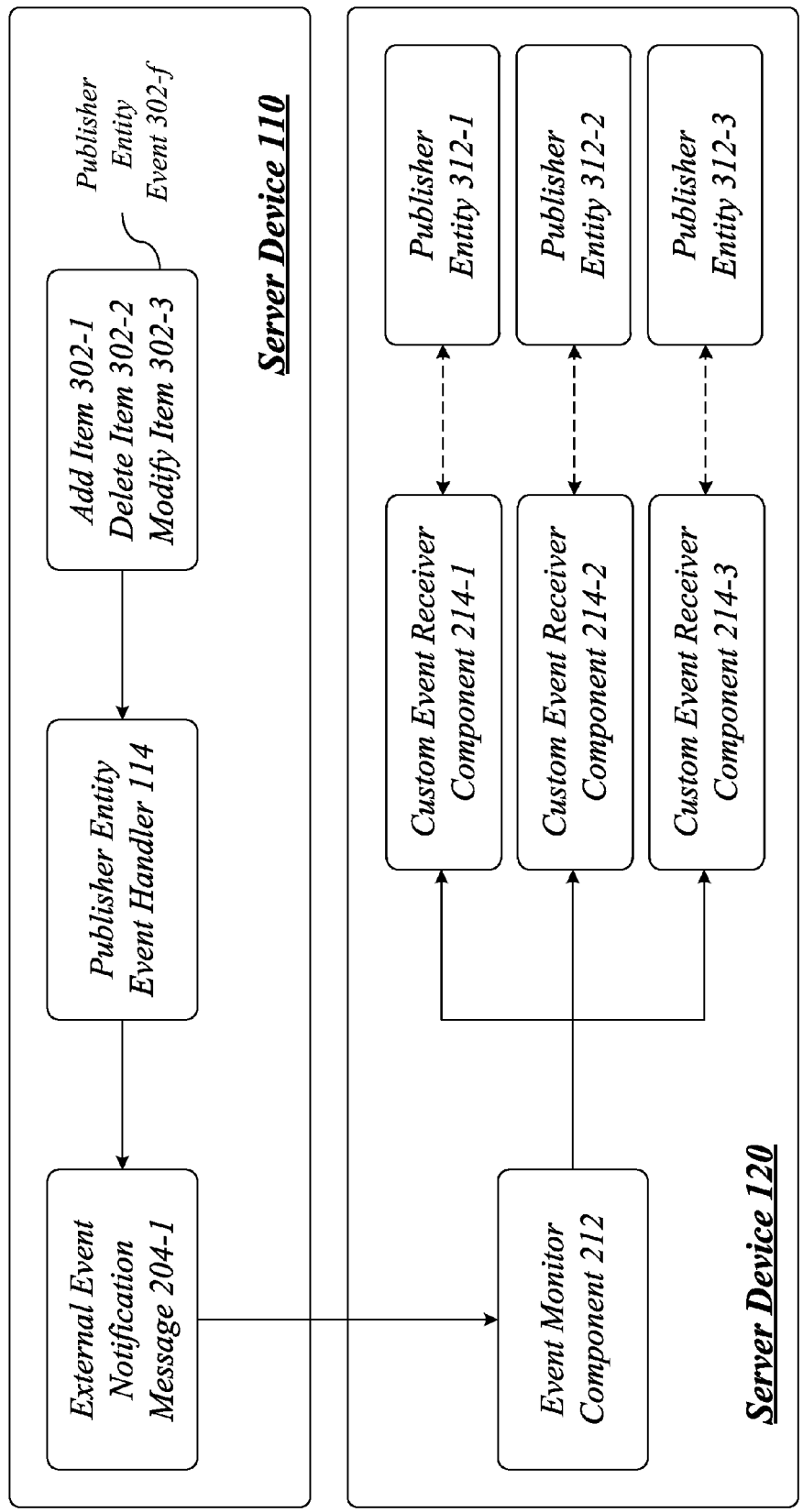
FIG. 3 illustrates one embodiment of an operational environment for a remote event management system and a more detailed diagram of an event monitor component.

FIG. 3 illustrates one embodiment of an operational environment 300 for the remote event management system 100 and a more detailed diagram of an event monitor component 212.

As shown in FIG. 3, the publisher entity handler 112 may detect a publisher entity event 302-*f* for the publisher entity 112 at the server device 110. Examples of publisher entity events 302-*f* may include an add item event 302-1, a delete item event 302-2, a modify item event 302-3, among others. The publisher entity event handler 114 may generate and send an external event notification message 204-1 to the server device 120 using, for example, the REST based input point.

The event monitor component 212 may receive the external event notification message 204-1, and select a custom event receiver component 214-e associated with a publisher entity 312-g from among multiple custom event receiver components 214-e, and send the external event notification message 204-1 to the selected custom event receiver component 214-e. Each custom event receiver component 214-e may correspond to a different publisher entity 312-g. Each publisher entity 312-g may be an instance of the publisher entity 112 described with reference to FIG. 1. As shown in FIG. 3, a custom event receiver component 214-1 may be associated with a publisher entity 312-1, a custom event receiver component 214-2 may be associated with a publisher entity 312-2, and a custom event receiver component 214-3 may be associated with a publisher entity 312-3.

Figure 4:
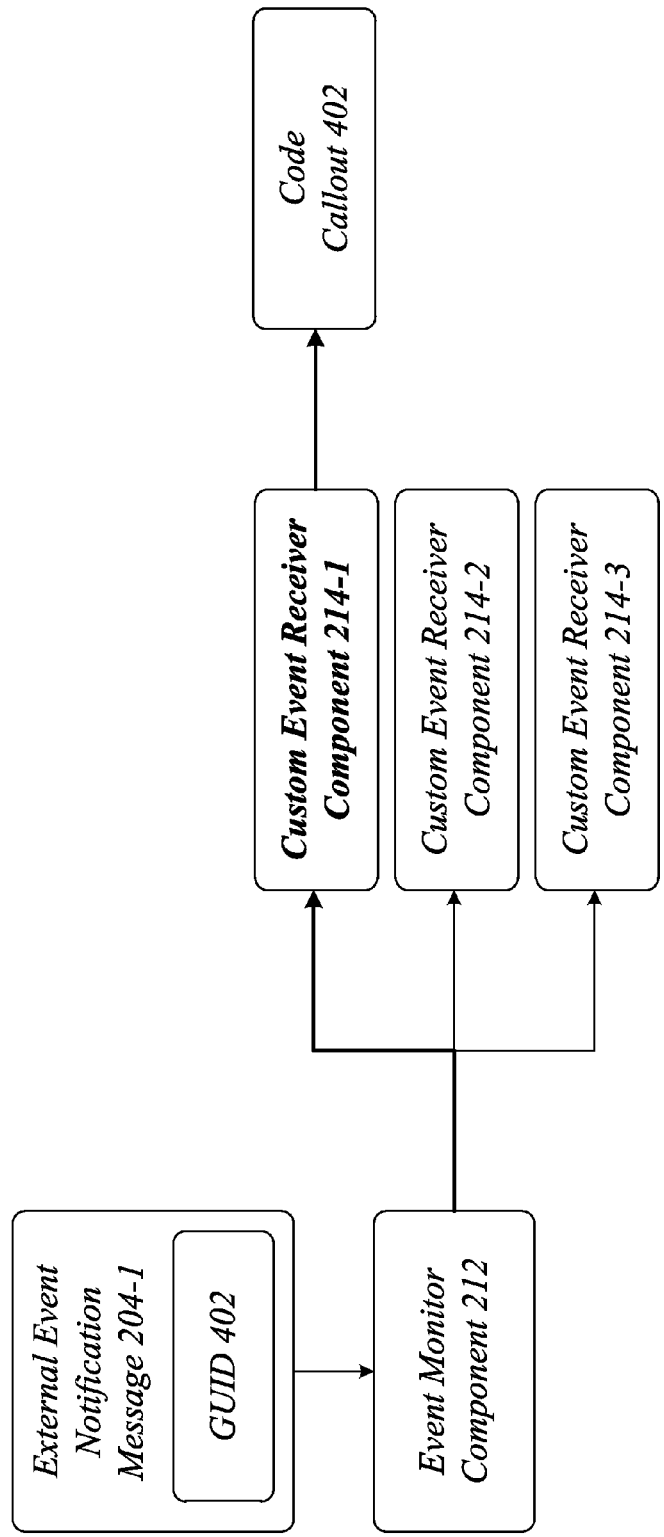
FIG. 4 illustrates one embodiment of an operational environment for a remote event management system and a more detailed diagram of a custom event receiver.

FIG. 4 illustrates one embodiment of an operational environment 400 for the remote event management system 100 and a more detailed diagram of a custom event receiver component 214-a.

As shown in FIG. 4, the event monitor component 212 may receive an external event notification message 204-1, and select a custom event receiver component 214-1 for the external event notification message 204-1 based on a globally unique identifier (GUID) 402 assigned to the publisher entity 312-g associated with the external event notification message 204-1. Assume the GUID 402 identifies the publisher entity 312-1, the event monitor component 212 may select the custom event receiver component 214-1 as indicated by the bolded text in FIG. 4.

The custom event receiver component 214-1 may implement custom business logic, such as a code callout 402 designed for specific application programs or system programs. For instance, the custom event receiver component 214-1 may receive the external event notification message 204-1, and invoke a code callout 402 arranged to perform custom logic in response to the publisher entity event. The code callout 402 may comprise computer program code governing actions in response to the publisher entity event in the server device 110.

The code callout 402 enables developers to have code which enables them to react to a change event in LOB data. For example, assume the publisher entity 112 is a list of service requests for customers of a car company stored in the datastore 116. Whenever a new service request is added to the list of service requests, the publisher entity handler 114 may detect the change event, and generate the external event notification message 204-1 with the change event information. The event monitor component 212 may receive the external event notification message 204-1, and select a custom event receiver component 214-1 associated with the publisher entity 112 and the server device 110. The custom event receiver component 214-1 may implement custom logic to support both the server device 110 and the client device 130. For instance, the new service request may be added to a virtual list of service requests managed by the server device 120. Additionally or alternatively, the new service request may be sent to the client device 130 using various messaging modalities. These operations may be accomplished without the server device 120 or the client device 130 having to directly access the datastore 116 of the server device 110, thereby decreasing response times and enhancing user experience.

A developer can design the code callout 402 to have a subscription at a list level or an entity level. For a list level code callout 402, the developer can write code as part of an event response to list. An entity code callout 402 may be supported by enabling developers to provide a code callout uniform resource locator (URL) for a network based service, such as a Microsoft Windows® Azure® service deployed by the developer. Azure is a cloud computing platform used to build, host, and scale web applications through network data centers. By utilizing different custom event receivers 214-a and code callouts 402, the remote event application 124 may act as a broker to receive a change event from an external LOB system and pass it on to a remote event receiver in various cloud computing architectures, such as Azure.

Figure 5:
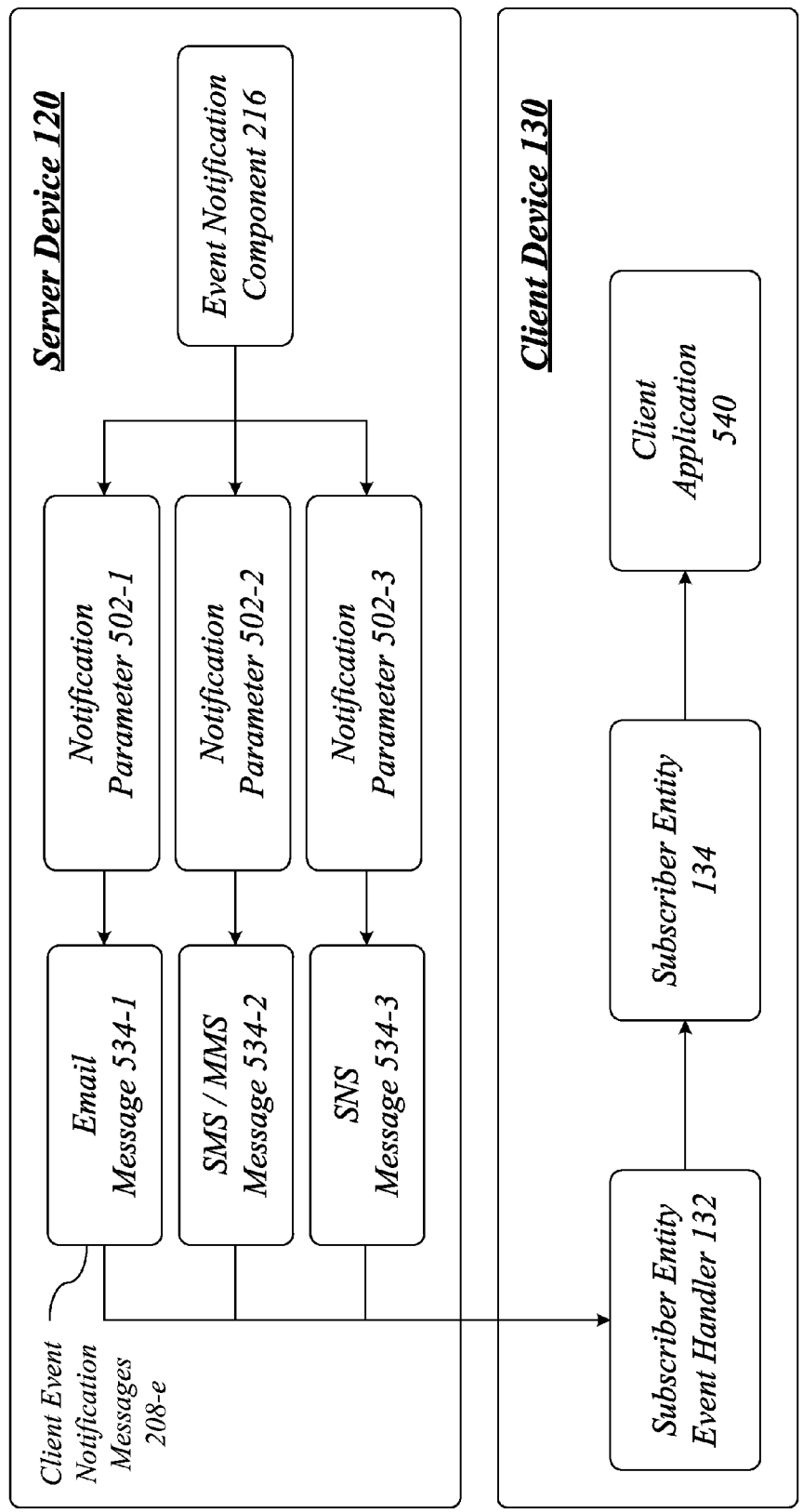
FIG. 5 illustrates one embodiment of an operational environment for a remote event management system and a more detailed diagram of an event notification component.

FIG. 5 illustrates one embodiment of an operational environment 500 for the remote event management system 100 and a more detailed diagram of an event notification component 216.

As shown in FIG. 5, the remote event application 124 may comprise an event notification component 216 arranged to retrieve a notification parameter 502-h associated with the subscriber entity 132, and send a client event notification message 208-e to a client application (e.g., a messaging application) associated with the subscriber entity 132. A user may configure a set of options for the event notification component 216 to send client event notification messages 208-e as encoded by the notification parameters 502-h. For instance, a notification parameter 502-1 may indicate a message type (e.g., email message), a notification parameter 502-2 may indicate a message time (e.g., email during business hours, SMS message during personal hours), a notification parameter 502-3 may indicate a client device 130 (e.g., work station during business hours, smart phone during personal hours), and so forth.

The event notification component 216 of the server device 120 may retrieve one or more notification parameters 502-h, and generate a client event notification message 208-e based on the notification parameters 502-h. For instance, the event notification component 216 may generate an email message 534-1, a SMS/MMS message 534-2, a SNS message 534-3, and so forth. The event notification component 216 may send the client event notification message 208-e to the client device 130.

The subscriber entity event handler 132 for the subscriber entity 134 may receive client event notification messages 208-e from the server device 120, and forward the client event notification messages 208-e to a client application 540. In one embodiment, for example, the client application 540 may comprise a message application. In one embodiment, for example, the client application 540 may comprise a thin-client for the LOB system and/or the enterprise system. The client application 540 may present the notification message to a user of the client device 130 using various graphical user interface (GUI) views having various GUI elements. The GUI views may be generated by the client application 540, the subscriber entity handler 134, and/or a native application for the client device 130, such as an operating system (OS) executing on the client device 130.

Figure 6A:
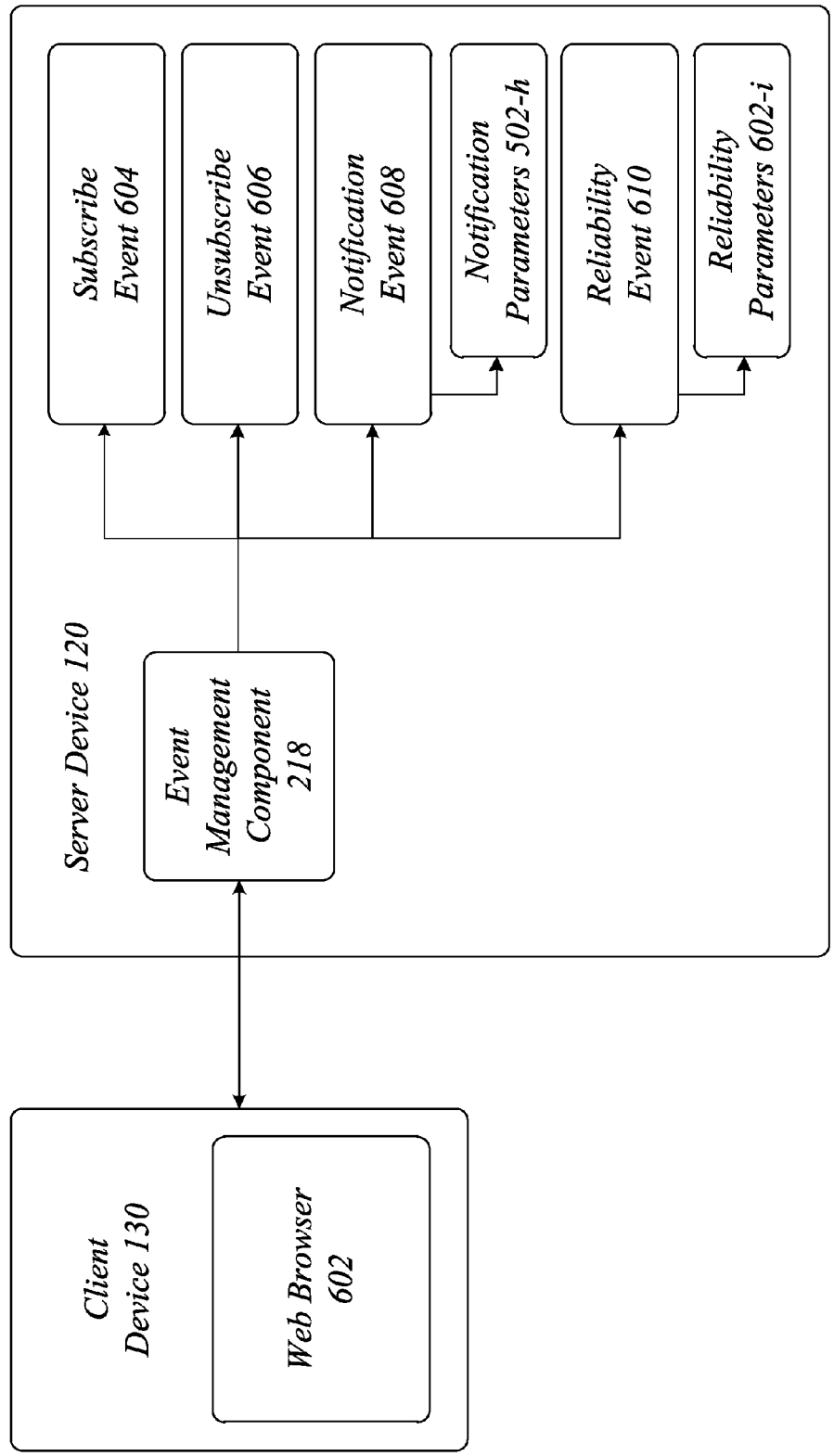
FIG. 6A illustrates one embodiment of a fifth operational environment for a remote event management system and a more detailed diagram of an event management component.

FIG. 6A illustrates one embodiment of an operational environment 600 for the remote event management system 100 and a more detailed diagram of an event management component 218.

The event management component 218 may provide management services to allow a user to manage various features of the remote event application 124. As shown in FIG. 6, a user may use a web browser 602 of the client device 130 to access various configuration options provided by the remote event application 124. The configuration options may be used to generate, among other types of configuration events, a subscribe event 604, an unsubscribe event 606, a notification event 608, and a reliability event 610.

The event management component 218 may manage a subscription between a publisher entity 112 and a subscriber entity 132. The subscribe event 604 and the unsubscribe event 606 are typically paired events. The subscribe event 604 triggers a set of operations to subscribe a subscriber entity 132 to a publisher entity 112 utilizing one or more external event management messages 202-b and client event management messages 206-c. Conversely, the unsubscribe event 606 triggers a set of operations to unsubscribe a subscriber entity 132 from a publisher entity 112 utilizing one or more external event management messages 202-b and client event management messages 206-c.

The event management component 218 may manage remote event notifications between a publisher entity 112 and a subscriber entity 132. The notification event 608 may be used set up notification services provided by the event notification component 216. For instance, a user may set one or more notification parameters 502-h for the subscriber entity 132 for client event notification messages 208-e.

The event management component 218 may manage a level of reliability for external event notification messages 204-d. The reliability event 610 may be used to set up different levels of reliability and/or QoS for external event notification messages 204-d received from the server device 110. The event management component 218 may manage a set of reliability parameters 602-i for each publisher entity 112. The event management component 218 may retrieve a reliability parameter 602-i representing a reliability level associated with the publisher entity 112, and process an external event notification message 204-d based on the reliability parameter 602-i.

The loosely coupled, asynchronous nature of event and notifications handling imposes some unique reliability requirements. When designing the event monitor component 212, a level of reliability desired for the event monitor component 212 may be a configurable option. Enterprise systems offer a variety of infrastructures for implementing services that offer different levels of reliability. Choosing a right infrastructure for a given enterprise system involves matching a level of reliability needed against capabilities of the infrastructure.

Change events passed in from an LOB system may range from informational notifications (e.g., "your expense report has been approved") to critical business events (e.g., "supplier has de-committed, trigger a workflow in SharePoint to select a new supplier'). For critical business events there needs to be both reliability and traceability, as these change events will drive event handlers and workflow in SharePoint.

To accommodate the varying types of notifications, the event management component 218 may allow a user to set different levels of reliability for notifications as encoded in the reliability parameters 602-i. An exemplary set of five reliability levels may be shown in Table 1 as follows:

TABLE 1

| Reliability Level | Description |
| --- | --- |
| Reliability Level 1 | Basic integration. Notifications work most of the time but cannot be counted on for mission critical scenarios. No guarantees around service level agreements. Change events may get lost, remain unprocessed, or be delivered multiple times. |
| Reliability Level 2 | Change events will get delivered not more than once. The event monitor component 212 will reject duplicate change events from the LOB system. However it is still possible that change events might not get received, or remain unprocessed. |

TABLE 1-continued

| Reliability Level | Description |
| --- | --- |
| Reliability Level 3 | Change events will get delivered exactly once. This will mean that the event monitor component 212 will never miss an event, even for high volumes of incoming events, as long as the SharePoint Farm is up. |
| Reliability Level 4 | Change events will get delivered exactly once even when the SharePoint farm is down. |
| Reliability Level 5 | No lost messages. There will be the ability to replay events to specific handlers for failure cases within the handlers. |

A user may use the event management component 218 to select a reliability level, and the event management component 218 may encode a reliability parameter 602-i and associated set of message handling parameters 604-j for the selected reliability level. It may be appreciated that the reliability levels shown in Table 1 are by way of example and not limitation. Any number of reliability levels may be established for a given implementation. The embodiments are not limited in this context.

Figure 6B:
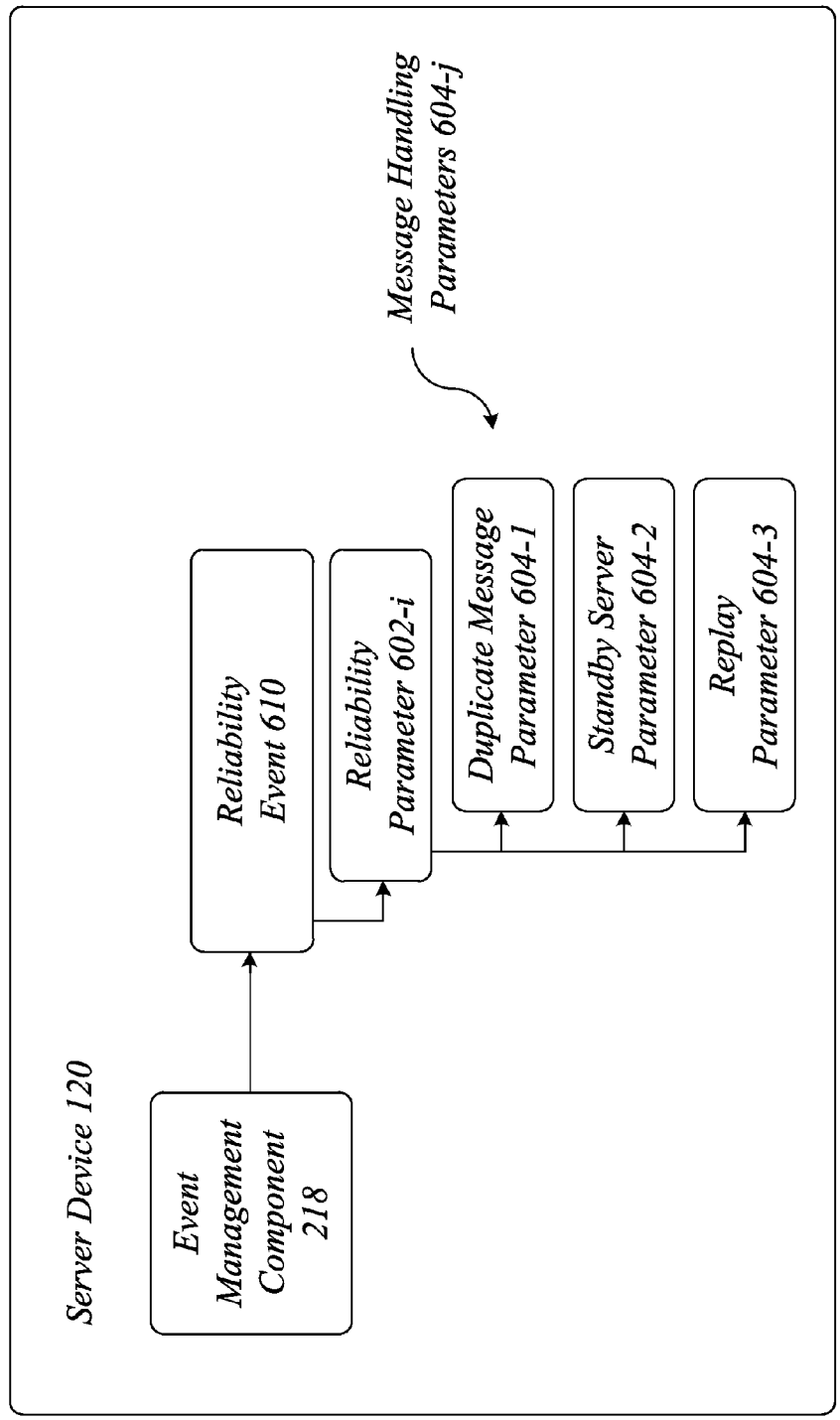
FIG. 6B illustrates one embodiment of a fifth operational environment for a remote event management system and a more detailed diagram of an event management component for a reliability event.

FIG. 6B illustrates one embodiment of an operational environment 600 for the remote event management system 100 and a more detailed diagram of an event management component 218 and a reliability event 610.

As shown in FIG. 6B, a reliability event 610 may initiate configuration of a reliability parameter 602-i corresponding to a reliability level selected by a user. The reliability parameter 602-i may have a set of message handling parameters 604-j configured to provide the selected reliability level. In one embodiment, the message handling parameters 604-j for a given reliability parameter 602-i may include a duplicate message parameter 604-1, a standby server parameter 604-2 and a replay parameter 604-3. It may be appreciated that the parameters 604-1 to 604-3 are by way of example and not limitation. Any number of message handling parameters 604-j may be used for a given implementation. The embodiments are not limited in this context.

The duplicate message parameter 604-1 may indicate whether to accept or reject duplicate external event notification messages 204-d received from an external LOB application. For lower levels of reliability (e.g., Reliability Level 1), the event monitor component 212 may accept all external event notification messages 204-d even when there are duplicate messages for the same change event at a LOB system. This reflects a condition where no message delivery guarantees are given at the cost of consuming more resources of the server device 120. When set to logical one (1), the duplicate message parameter 604-1 may indicate that duplicate external event notification messages 204-d are accepted from the server device 110. When set to logical zero (0), the duplicate message parameter 604-1 may indicate that duplicate external event notification messages 204-d are not accepted from the server device 110.

The standby server parameter 604-2 may indicate whether to send an external event notification message 204-d to a standby server when a primary server is non-operational. To ensure higher levels of reliability (e.g., Reliability Levels 2-5), the standby server parameter 604-2 may indicate what happens when the server device 120 is non-operational. For instance, assume the server device 120 is part of a server array for a SharePoint site. In those cases where the server device 120 is a primary server, and is non-operational to process notifications, the event monitor component 212 may route any external event notification messages 204-*d* it receives to a standby or backup server. This ensures that an external event notification message 204-*d* reaches a server for processing. In this scenario, the even monitor component 212 may be implemented in a network element separate from the server device 120, such as a network appliance or load balancer. When set to logical one (1), the standby server parameter 604-2 may indicate that external event notification messages 204-*d* are to be sent to a standby server when the server device 110 is non-operational. When set to logical zero (0), the standby server parameter 604-2 may indicate that external event notification messages 204-*d* are not to be sent to a standby server when the server device 110 is non-operational, and are simply discarded.

The replay parameter 604-3 may indicate whether to replay an external event notification message 204-*d* when the event monitor component 212 detects an error condition when processing the external event notification message 204-*d*. For those highest levels of reliability (e.g., Reliability Level 5), the replay parameter 604-3 may ensure that an external event notification message 204-*d* is not lost even when there is an internal error occurring in one of the components of the remote event application 124 or the server device 120. When an error condition is detected, the event monitor component 212 and/or a custom event receiver component 214-*a* may replay or re-process an external event notification message 204-*d*. Replay events may occur until the external event notification message 204-*d* has been completely processed by the remote event application 124 and/or the server device 120. When set to logical one (1), the replay parameter 604-3 may indicate that external event notification messages 204-*d* are to be replayed when an error condition occurs. When set to logical zero (0), the replay parameter 604-3 may indicate that external event notification messages 204-*d* are not replayed when an error condition occurs.

When the event monitor component 212 receives an external event notification message 204-*d*, the event monitor component 212 may retrieve a reliability parameter 602-*i* associated with the publisher entity 112 and any associated message handling parameters 604-*j*. The event monitor component 212 may then handle the external event notification message 204-*d* in accordance with the reliability parameter 602-*i* and the message handling parameters 604-*j*.

By way of example, assume the publisher entity 112 has a reliability parameter 602-1 set to a reliability level one. In this case, the message handling parameters 604-*j* may comprise a duplicate message parameter 604-1, a standby server parameter 604-2, and a replay parameter 604-3 all set to logical zero (0).

Continuing with this example, assume the publisher entity 112 has a reliability parameter 602-1 set to a reliability level two. In this case, the message handling parameters 604-*j* may comprise a duplicate message parameter 604-1 set to logical one (1), and a standby server parameter 604-2 and a replay parameter 604-3 set to logical zero (0).

Continuing with this example, assume the publisher entity 112 has a reliability parameter 602-1 set to a reliability level three. In this case, the message handling parameters 604-*j* may comprise a duplicate message parameter 604-1 and a replay parameter 604-3 set to logical one (1), and a standby server parameter 604-2 set to logical zero (0).

Continuing with this example, assume the publisher entity 112 has a reliability parameter 602-1 set to a reliability level four. In this case, the message handling parameters 604-*j* may comprise a duplicate message parameter 604-1 and a standby server parameter 604-2 set to logical one (1), and a replay parameter 604-3 set to logical zero (0).

Continuing with this example, assume the publisher entity 112 has a reliability parameter 602-1 set to a reliability level five. In this case, the message handling parameters 604-*j* may comprise a duplicate message parameter 604-1, a standby server parameter 604-2, and a replay parameter 604-3 all set to a logical one (1).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
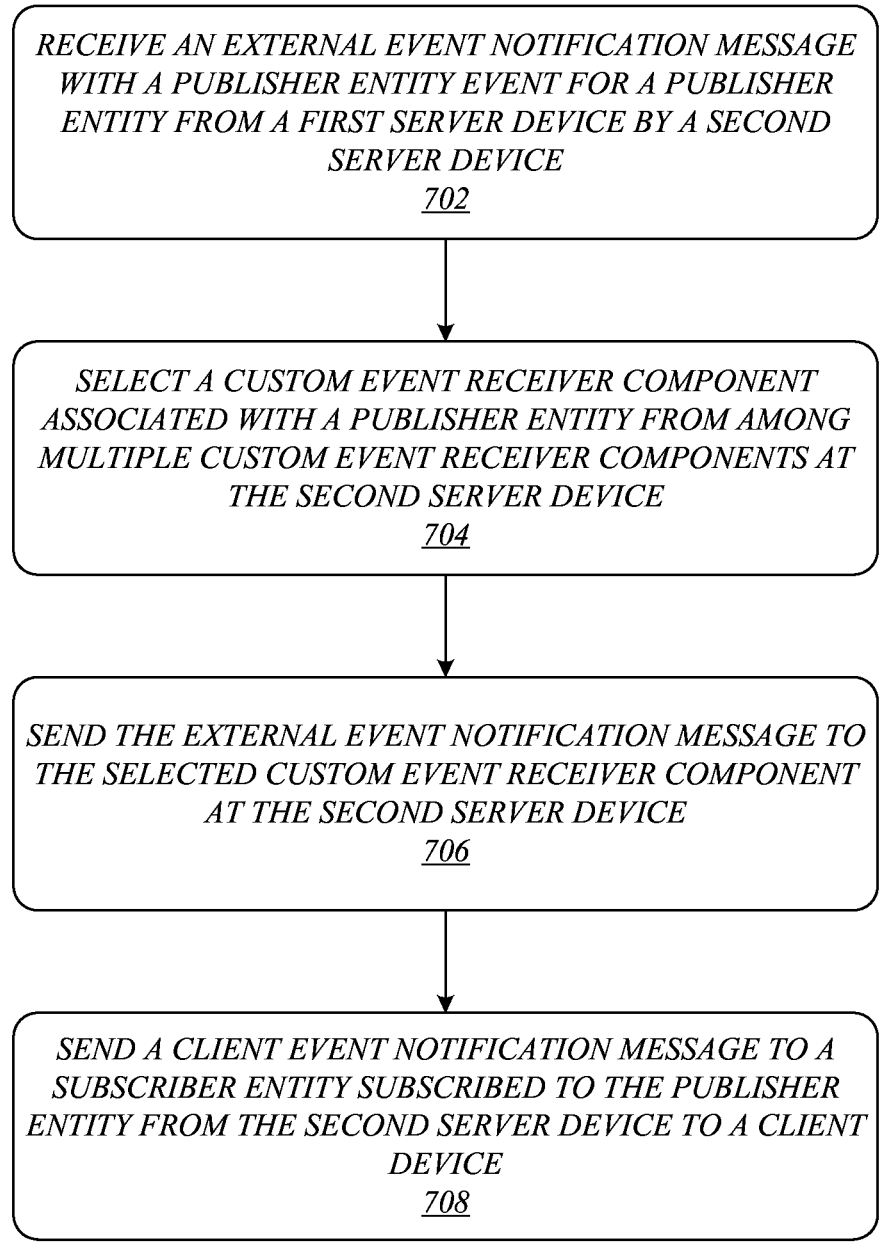
FIG. 7 illustrates one embodiment of a logic flow for a remote event management system.

FIG. 7 illustrates one embodiment of a logic flow 700. The logic flow 700 may be representative of some or all of the operations executed by one or more embodiments described herein, such as the remote event application 124, for example.

In the illustrated embodiment shown in FIG. 7, the logic flow 700 may receive an external event notification message with a publisher entity event for a publisher entity from a first server device by a second server device at block 702. For instance, the event monitor component 212 of the remote event application 124 may receive an external event notification message 204-*d* with a publisher entity event 302-*f* for a publisher entity 112 from a first server device 110 by a second server device 120. The publisher entity event 302-*f* may comprise a change event representing a change in state of LOB data stored in the datastore 116 of the server device 110.

The logic flow 700 may select a custom event receiver component associated with a subscriber entity from among multiple custom event receiver components at the second server device at block 704. For instance, the event monitor component 212 may select a custom event receiver component 214-1 associated with the publisher entity 112 from among multiple custom event receiver components 214-1 to 214-*a* at the second server device 120. The selected custom event receiver component 214-1 may be specifically designed to receive and process event notifications from the publisher entity 112 and/or the server device 110.

The logic flow 700 may send the external event notification message to the selected custom event receiver component at the second server device at block 706. For instance, the event monitor component 212 may send the external event notification message 204-*d* to the selected custom event receiver component 214-1 at the second server device 120. In this case, the event monitor component 212 operates as a router or switch to route external event notification messages 204-*d* from different LOB systems to an appropriate custom event receiver component 214-*a* customized for the LOB system.

The logic flow 700 may send a client event notification message to a subscriber entity subscribed to the publisher entity from the second server device to a client device at block 708. For instance, the event notification component 216 of the remote event application 124 send a client event notification message 208-*e* to a subscriber entity 132 that has previously subscribed to the publisher entity 112 from the second server device 120 to a client device 130. For instance, the event notification component 216 may generate an email message and send the email message to the client application 540 of the client device 130.

Figure 8:
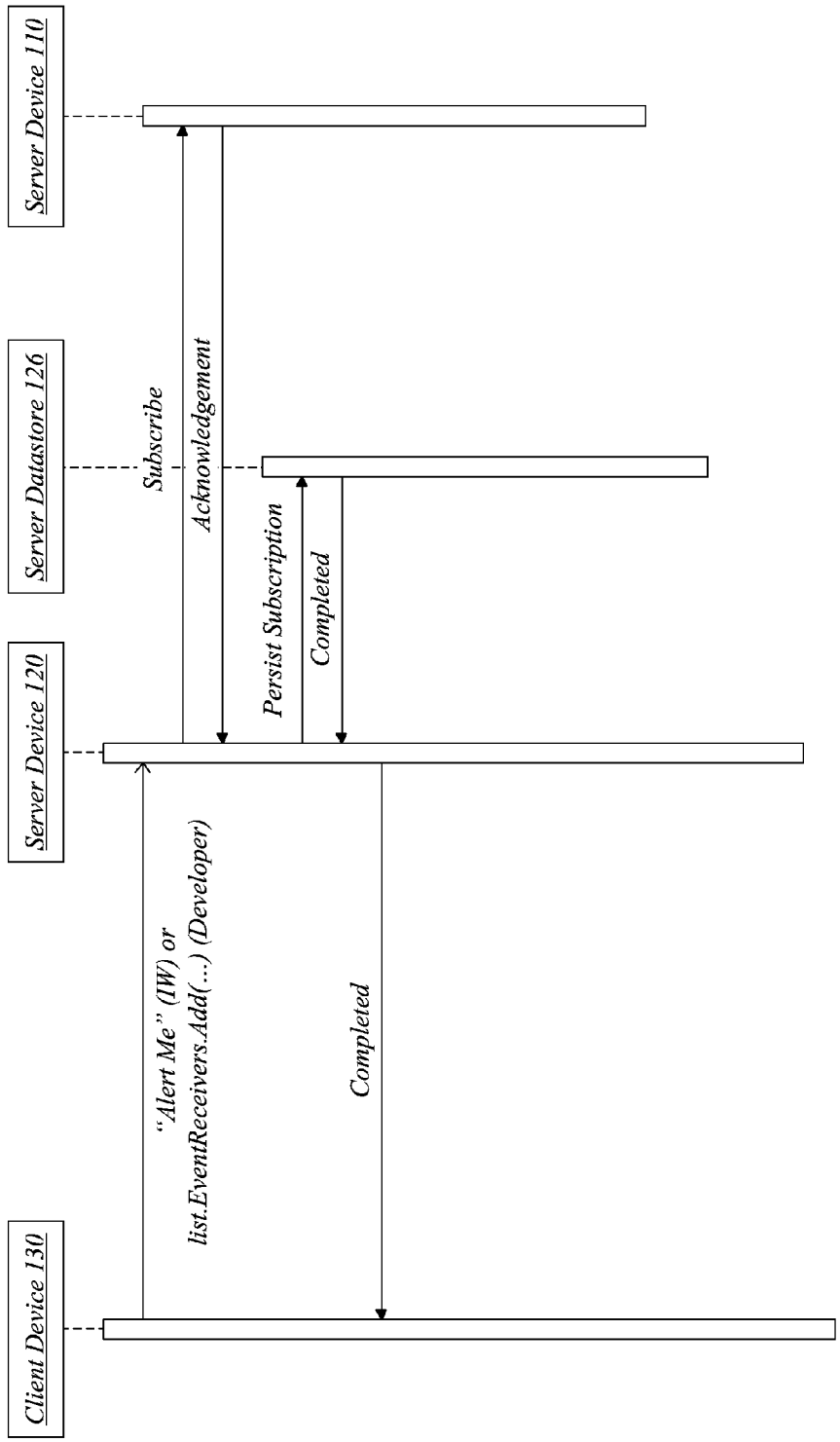
FIG. 8 illustrates one embodiment of a message flow for subscribe operations of a remote event management system.

FIG. 8 illustrates one embodiment of a message flow 800 for subscribe operations of the remote event management system 100 in response to a subscribe event 604. As shown in the message flow 800, the client device 130 may send an "Alert Me" (IW) or list.eventreceivers.add( . . . ) request for a subscriber entity 132 to the server device 120. The server device 120 may initiate subscribe operations with the publisher entity 112 of the server device 110. The server device 110 may subscribe the subscriber entity 132 to the publisher entity 112, and configure the publisher entity handler 114 for connections with the server device 120. The server device 110 may then send an acknowledgement message to the server device 120. The server device 120 may persist the subscription to the datastore 126 of the server device 120, and once stored, send a subscribe complete message to the client device 130.

Figure 9:
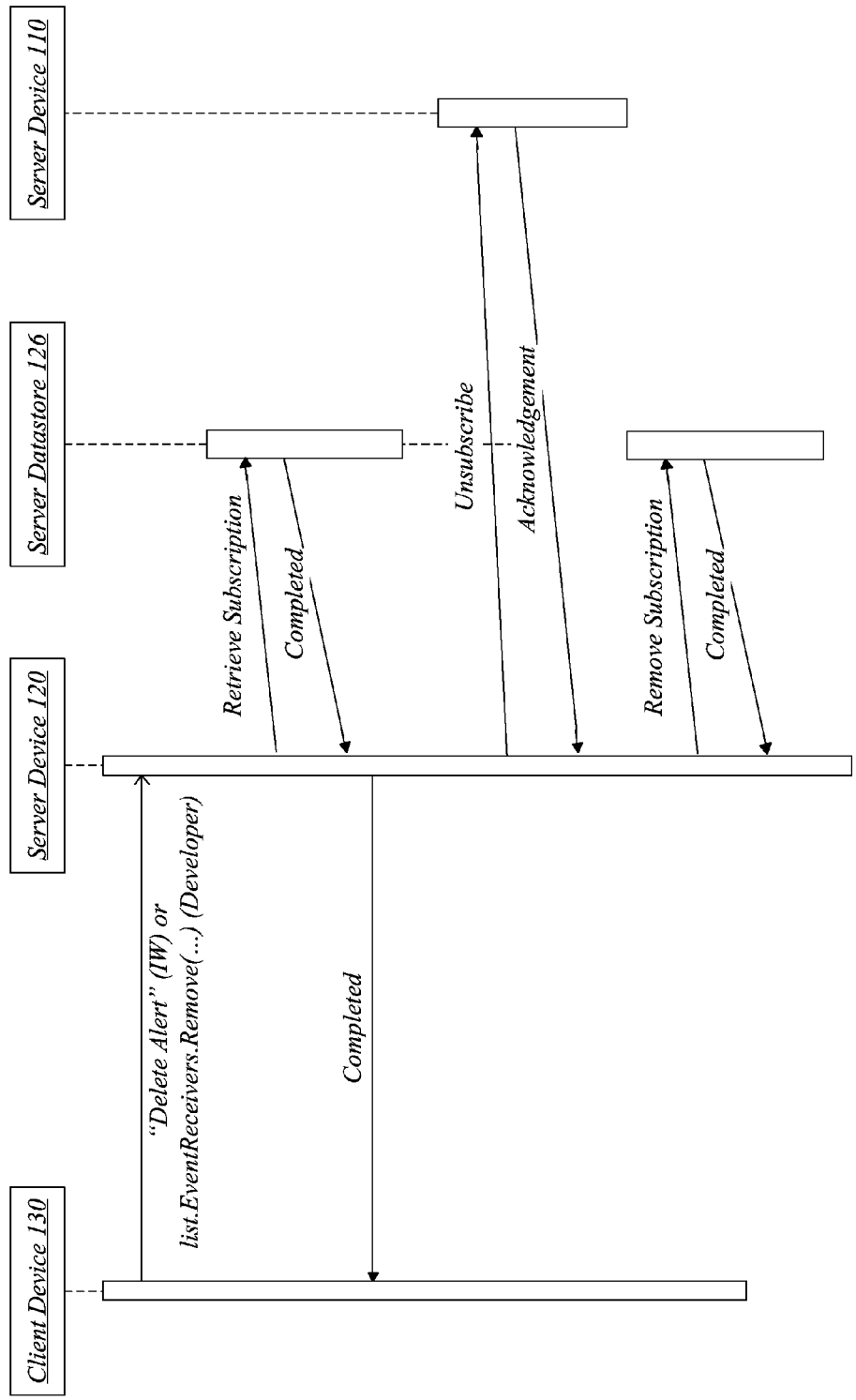
FIG. 9 illustrates one embodiment of a message flow for unsubscribe operations a remote event management system.

FIG. 9 illustrates one embodiment of a message flow 900 for unsubscribe operations of the remote event management system 100 in response to an unsubscribe event 606. As shown in the message flow 800, the client device 130 may send a "Delete Alert" (1W) or list.eventreceivers. remove( . . . ) request to the server device 120. The server device 120 may retrieve a subscription from the datastore 126, and initiate unsubscribe operations to unsubscribe the subscriber entity 132 from the publisher entity 112 of the server device 110. The server device 110 may unsubscribe the subscriber entity 132 from the publisher entity 112, and configure the publisher entity handler 114 to remove connections with the server device 120. The server device 110 may then send an acknowledgement message to the server device 120. The server device 120 may remove the subscription from the datastore 126 of the server device 120, and once removed, send an unsubscribe complete message to the client device 130.

Figure 10:
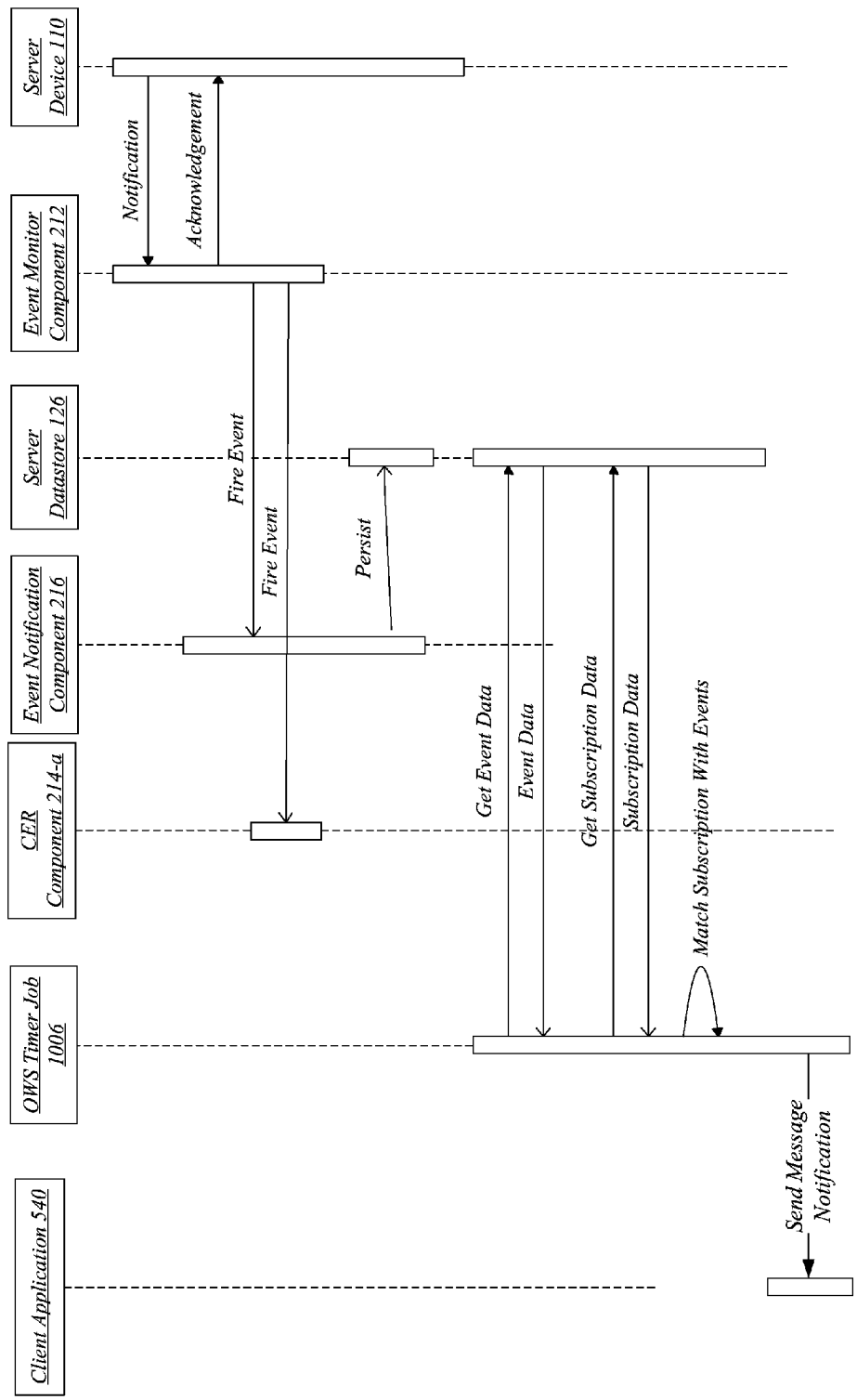
FIG. 10 illustrates one embodiment of a message flow for notification operations of a remote event management system.

FIG. 10 illustrates one embodiment of a message flow 1000 for notification operations of the remote event management system 100. As shown in the message flow 1000, the server device 110 may send an external event notification message 204-d to the server device 120. The event monitor component 212 of the remote event application 124 implemented by the server device 120 may send an acknowledgement back to the server device 110 to indicate the external event notification message 204-d has been successfully received. The event monitor component 212 may send a fire event signal to the event notification component 216 indicating the external event notification message 204-d has been received, select a custom event receiver 214-1 from multiple custom event receivers 214-1 to 214-a, and route the external event notification message 204-d to a custom event receiver 214-1.

The event notification component 216 may persist the external event notification message 204-d in the datastore 126 of the server device 120. The datastore 126 may comprise, for example, a SharePoint content database for a SharePoint application.

The custom event receiver 214-1 may send a request to get event data from the datastore 126, and receive the event data from the datastore 126. The custom event receiver 214-1 may also send a request to get subscription data from the datastore 126, and receive the subscription data from the datastore 126. The custom event receiver 214-1 may compare the event data and the subscription data, and when there is a match, send a client event notification message 208-e to the client application 540 of the client device 130.

Figure 11:
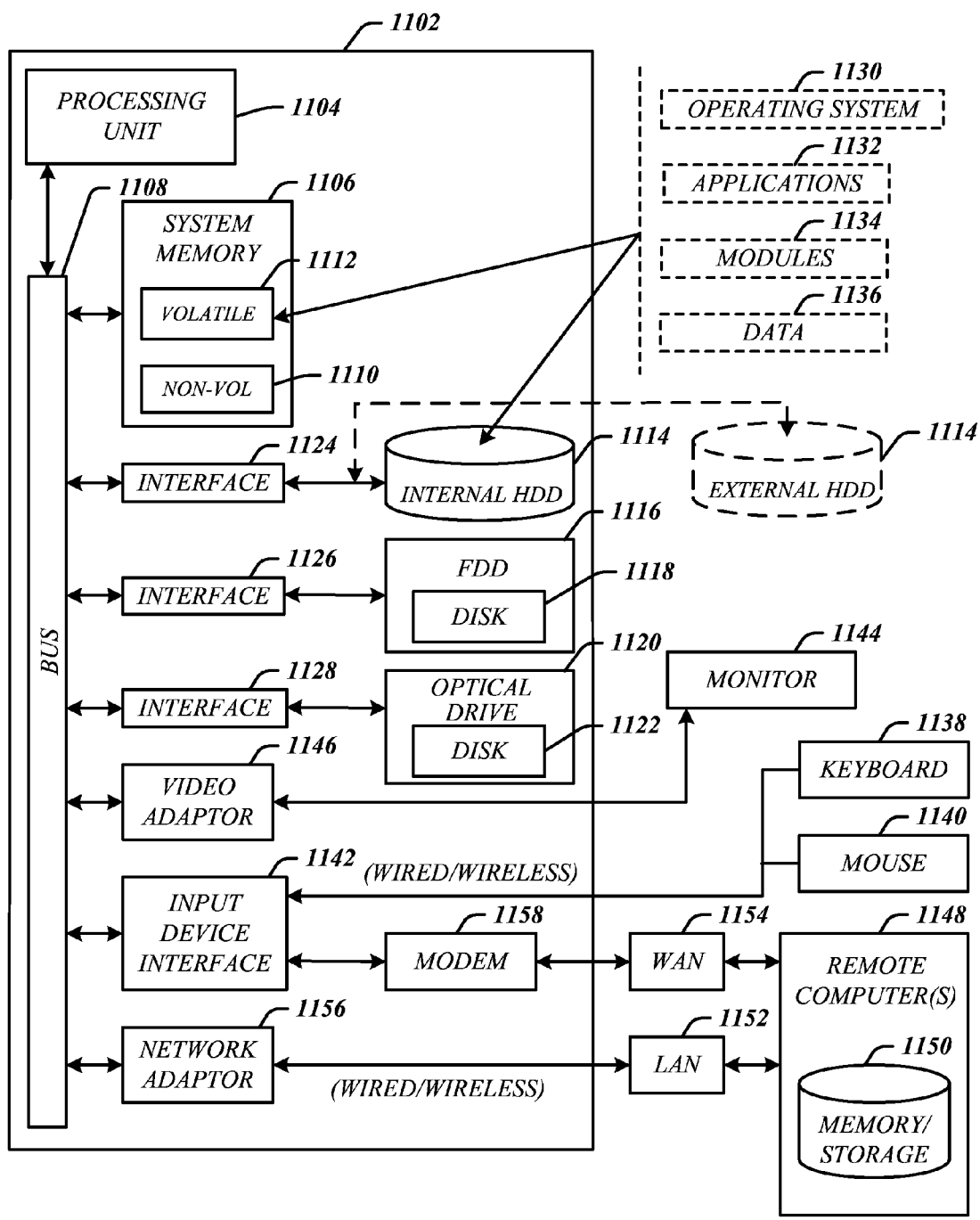
FIG. 11 illustrates one embodiment of an exemplary computing system architecture suitable for use with a remote event management system.

FIG. 11 illustrates an embodiment of an exemplary computing architecture 1100 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi-processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

The one or more application programs 1132, other program modules 1134, and program data 1136 can include, for example, the remote event application 124, the event monitor component 212, the custom event receiver component 214-a, the event notification component 216, the event management component 218, the publisher entity 112, the publisher entity handler 114, the subscriber entity 132, the subscriber entity handler 134, and so forth.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1194 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
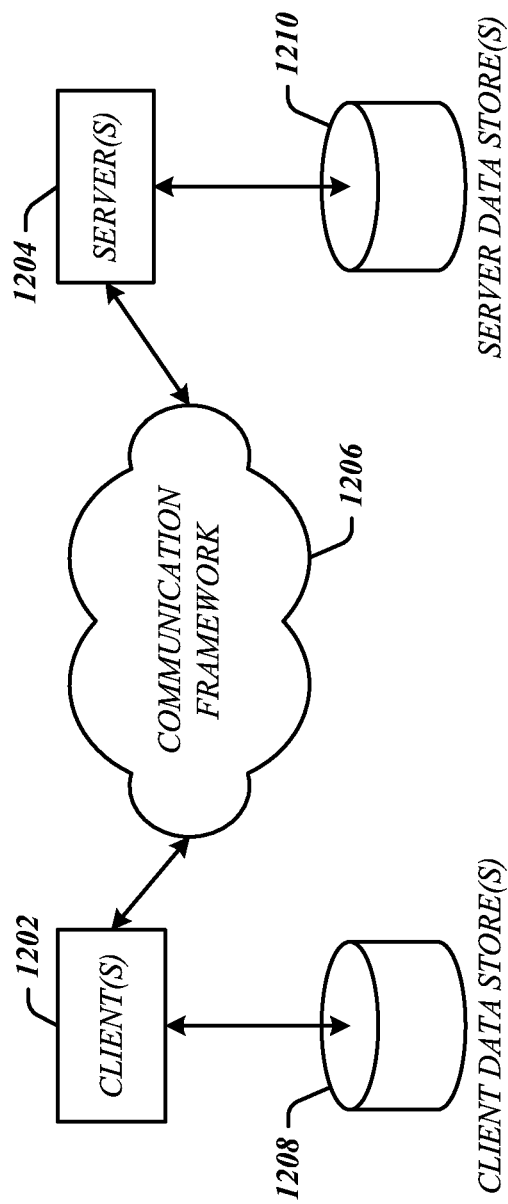
FIG. 12 illustrates one embodiment of an exemplary communications system architecture suitable for use with a remote event management system.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 130. The servers 1204 may implement the server devices 110, 120. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols, such as those described with reference to the information visualization system 100. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
a remote event application operative on the processor circuit to manage remote event notifications between a publisher entity and a subscriber entity, the remote event application comprising:
an event monitor component operative to:
receive an external event notification message identifying a publisher entity event, wherein the publisher entity event is an update to data stored in a data source maintained by the publisher entity, wherein the publisher entity is remote from the apparatus and the subscriber entity;
select a custom event receiver component corresponding to the publisher entity from among multiple custom event receiver components, wherein the selected custom event receiver component comprises at least one code callout for performing at least one operation; and
send the external event notification message to the selected custom event receiver component;
the selected custom event receiver component operative to:
automatically invoke the code callout to perform at least one operation, wherein the at least one operation is responsive to the publisher entity event; and
an event notification component operative to:
send a client event notification message to the subscriber entity upon performing the at least one operation, wherein the subscriber entity is not in direct communication with the publisher entity.

2. The apparatus of claim 1, the event monitor component comprising a representational state transfer (REST) based input point.

3. The apparatus of claim 1, the data source corresponding to an external application of the publisher entity.

4. The apparatus of claim 3, the publisher entity event comprising a change in state of the data stored by the data source for the external application.

5. The apparatus of claim 1, the event monitor component operative to select the custom event receiver component for the external event notification message based on a globally unique identifier (GUID) for the publisher entity associated with the external event notification message.

6. The apparatus of claim 1, wherein the code callout is arranged to perform custom logic in response to the publisher entity event.

7. The apparatus of claim 1, the event notification component further operative to retrieve a notification parameter associated with the subscriber entity, and send the client event notification message to a client application associated with the subscriber entity, wherein the subscriber entity subscribes to the publisher entity.

8. The apparatus of claim 1, the remote event component comprising an event management component operative to manage a subscription between the publisher entity and the subscriber entity.

9. The apparatus of claim 8, the event management component operative to manage a level of reliability for external event notification messages.

10. The apparatus of claim 8, the event management component operative to retrieve a reliability parameter representing a reliability level associated with the publisher entity, and process the external event notification message based on the reliability parameter.

11. The apparatus of claim 10, comprising a set of message handling parameters associated with the reliability parameter, the message handling parameters comprising a duplicate message parameter, a standby server parameter, or a replay parameter, the duplicate message parameter indicating whether to accept or reject duplicate external event notification messages received from the external application, the standby server parameter indicating whether to send the external event notification message to a standby server when a primary server is non-operational, and the replay parameter indicating whether to replay the external event notification message when the event monitor component detects an error condition when processing the external event notification message.

12. A computer-implemented method, comprising:
   receiving, at a second server device, an external event notification message identifying a publisher entity event, wherein the publisher entity event is an update to data stored by a publisher entity, wherein the publisher entity operates from a first server device that is remote from the second server device;
   selecting, at the second server device, a custom event receiver component corresponding to the publisher entity from among multiple custom event receiver components, wherein the selected custom event receiver component comprises at least one code callout for performing at least one operation;
   sending the external event notification message to the selected custom event receiver component at the second server device, wherein the selected custom event receiver component automatically invokes the code callout to perform the at least one operation, wherein the at least one operation is responsive to the publisher entity event; and
   upon performing the at least one operation, sending a client event notification message from the second server device to a subscriber entity operating on a client device, wherein the subscriber entity is not in direct communication with the publisher entity.

13. The computer-implemented method of claim 12, comprising selecting the custom event receiver component for the external event notification message based on a globally unique identifier (GUID) for the publisher entity associated with the external event notification message.

14. The computer-implemented method of claim 12, wherein the code callout is arranged to perform custom logic in response to the publisher entity event.

15. The computer-implemented method of claim 12, comprising sending the client event notification message as an electronic mail message, a short messaging service (SMS) message, a multimedia messaging service (MMS) message, or a social networking service (SNS) message.

16. An article of manufacture comprising a computer-readable storage medium containing instructions that when executed enable a computer system to:
   receive an external event notification message identifying a publisher entity event, wherein the publisher entity event is an update to data stored by the publisher entity;
   select a custom event receiver component corresponding to the publisher entity from among multiple custom event receiver components, wherein the selected custom event receiver component comprises at least one code callout for performing at least one operation; and
   send the external event notification message to the selected custom event receiver component, wherein the selected custom event receiver component automatically invokes the code callout to perform the at least one operation, wherein the at least one operation is responsive to the publisher entity event; and
   upon performing the at least one operation, send a client event notification message to a subscriber entity, wherein the subscriber entity is not in direct communication with the publisher entity.

17. The article of manufacture of claim 16, further comprising instructions that when executed enable the computer system to:
   select the custom event receiver component for the external event notification message based on a globally unique identifier (GUID) for the publisher entity associated with the external event notification message.

18. The article of manufacture of claim 16, wherein the code callout is arranged to perform custom logic in response to the publisher entity event.

19. The article of manufacture of claim 16, further comprising instructions that when executed enable the computer system to:
   send the client event notification message to a client application associated with the subscriber entity subscribed to the publisher entity.

20. The article of manufacture of claim 16, further comprising instructions that when executed enable the computer system to:
   send the client event notification message to a client application associated with the subscriber entity subscribed to the publisher entity, the client event notification message comprising an electronic mail message, a short messaging service (SMS) message, a multimedia messaging service (MMS) message, or a social networking service (SNS) message.

\* \* \* \* \*